UNITED STATES PATENT OFFICE.

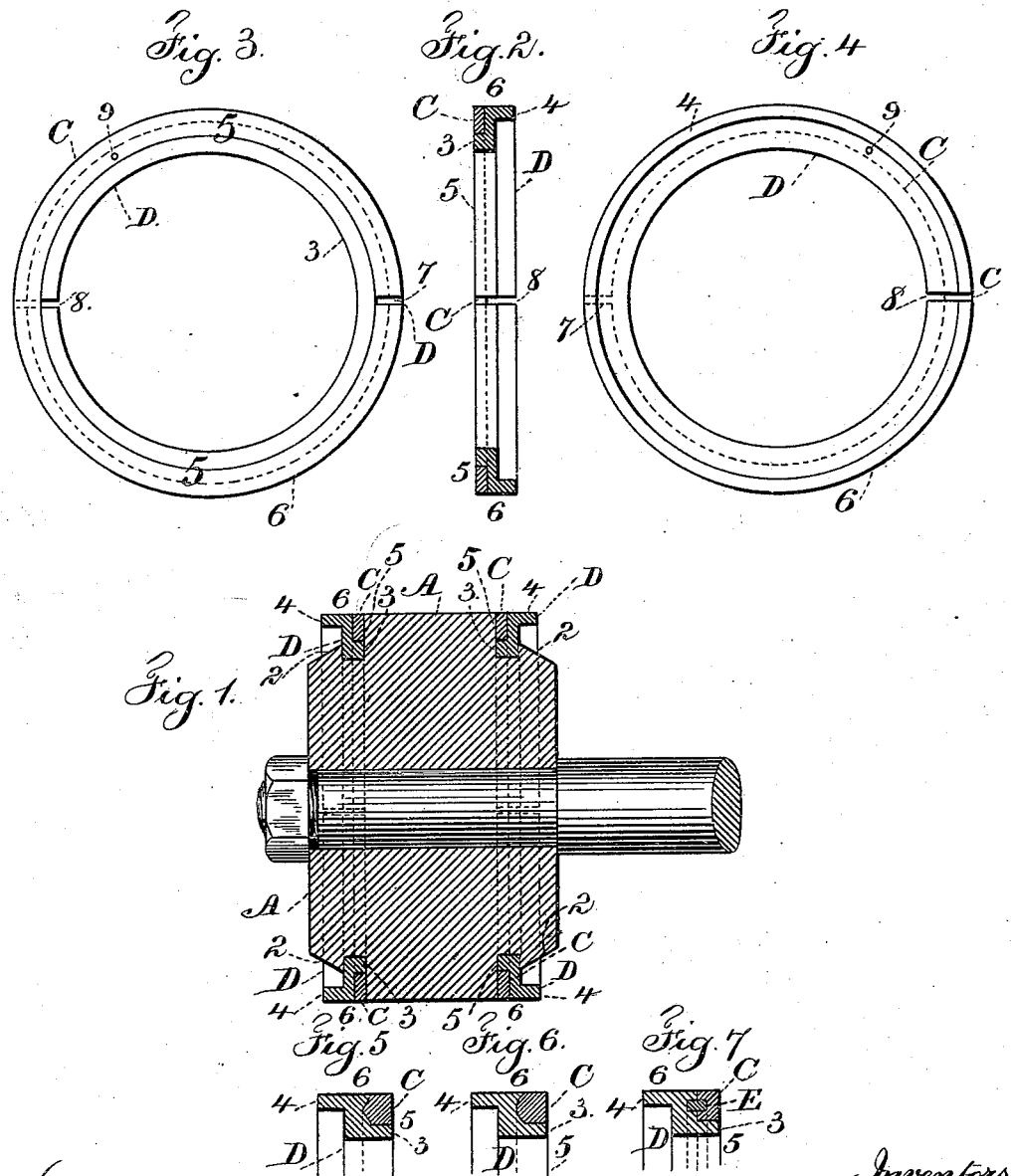

AMBROSE A. TRIPOLD AND CHARLES F. DAVENPORT, OF BROOKLYN, NEW YORK.

PACKING FOR PISTONS.

SPECIFICATION forming part of Letters Patent No. 473,182, dated April 19, 1892.

Application filed December 17, 1891. Serial No. 415,345. (No model.)

*To all whom it may concern:*

Be it known that we, AMBROSE A. TRIPOLD and CHARLES F. DAVENPORT, citizens of the United States, residing at Brooklyn, in the county of Kings and State of New York, have invented an Improvement in Packing-Rings for Steam and other Pistons, of which the following is a specification.

Packing-rings have heretofore been made in numerous sections set together so as to break joints, and in some instances these packing-rings have been made with a flange on one ring, against which a section of the other ring rests; but in these instances difficulty has arisen in causing the sectional rings to set tightly against the interior of the cylinder.

Our improvement is made with reference to furnishing one flat surface composed of portions of two split expansive rings and a second surface that is cylindrical and also composed of two parts of the same rings, so that a tight expansive packing is made in consequence of the notch in one expansive ring being adjacent to the plain or unnotched portion of the other ring, and these parts are made with reference to the expansive power of the spring being augmented by the pressure of the steam or fluid acting within the ring itself.

In the drawings, Figure 1 is a section of a piston fitted with these improved packing-rings. Figs. 2, 3, and 4 are sectional and plan views of the rings separately, and Figs. 5, 6, and 7 are detached sections of the rings in modified shapes.

The piston A is to be of any desired character. We prefer to make use of a piston having a cylindrical surface and annular grooves around the same near the ends of the cylindrical portion, there being conical lips 2, over which the expansive rings are forced and by which such rings are held in position around the piston after being inserted into the cylinder, and the packing-rings stand in opposite directions at the respective ends of the piston, as represented.

Each packing-ring is composed of two parts C and D. The ring C is flat, and the ring D is provided with two flanges, the flange 3 being annular to set within the ring C and the flange 4 being cylindrical and standing in the opposite direction to the flange 3 and forming a wearing-surface against the interior surface of the cylinder.

The contacting-surfaces of the rings C and D are accurately fitted, so as to be fluid-tight, and with this object in view it is preferable to turn the respective rings and set them together and then true off the flat surface 5 and the cylindrical surface 6, after which the rings are to be split at one place, so as to be expansive, and the one ring is rotated upon the other, so that the split of one ring is adjacent to the plain portion of the other ring. Hence the flat surface 5 is made steam-tight against the corresponding surface of the piston, because the notch 7 of the ring C is adjacent to a plain portion of the flange 3, and the notch 8 in the ring D is opposite a plain portion of the ring C, and this is always true of the cylindrical surface 6. Hence it is impossible for steam or other fluid to leak through between the rings and the cylinder or between the rings and the piston, and it is to be observed that, the packing-rings standing in opposite directions upon the piston, the steam-pressure tends to force the flat surface 5 of one packing against the piston when going in one direction, and when going in the other direction the pressure acts in a similar manner upon the other packing, and in addition to this the pressure of the steam or other fluid within the cylindrical flange 4 tends to press the packing-ring D outwardly and hold the same firmly against the interior of the cylinder, and in so doing the flange 3 acts to expand the ring C to the same extent and cause both packing-rings to wear equally against the interior of the cylinder.

The rings shown in Figs. 5 and 6 are to be made in precisely the manner before described, except that the surfaces that come together are in Fig. 5 double inclines and in Fig. 6 concave and convex. In Fig. 7 we have represented a third ring E as introduced into the annular grooves in the adjacent flat faces of the rings C and D. These modifications in the sectional forms of the rings do not change the operations of the parts. A pin 9 may be provided to hold the rings from turning around one on the other.

We are aware that the pressure of steam has been used to force the packing-rings outwardly and also that sections of rings have been packed together to break joints; but they do not expand of their own elasticity; and one expansible ring has been recessed near the place of separation for the reception of a filling-piece. This filling-piece is intended to cover the place of separation; but it is not in any respect the equivalent of a complete ring. Neither does it act in the same manner as a complete ring, and in practice it is found that the steam passes along the joint between the filling-piece and the surfaces of the recess, and there is nothing to effect a tight joint at these parts, and in addition to this there is in substance but one expansive ring to each packing, and this expansive ring is not of uniform elasticity and it is much more rigid at one part than the other. On the contrary, in the present invention the two rings that go to make up the one packing are much more elastic than the packings heretofore made use of, and they are of uniform elasticity all around, and they wear with uniformity and will accommodate inequalities in the cylinder without leakage, and the one elastic ring surrounding the other tends to unify the elasticity in case of inequality in the metal itself. Packing-rings have been employed near the edges of the piston-blocks; but there is not any instance where each packing has been made of two complete rings, the one setting upon the flange of the other and adapted to being pressed outwardly by the action of the steam, the separation of one ring coming diametrically opposite to the separation of the other ring, so as to unify the elasticity and make a perfectly-tight joint.

We claim as our invention—

1. The packing for steam and other pistons, formed of the two split expansive rings C and D, the ring D having the flanges 3 and 4, the flange 3 being within the ring C, substantially as set forth.

2. The packing for steam and other pistons, composed of the two split expansive rings C and D, the ring D having a flange 3 within the ring C, so that the flat surface 5 is composed of parts of the rings C and D and the cylindrical surface 6 is also composed of portions of the surfaces of the rings C and D, the splits in the respective rings not coinciding, substantially as set forth.

Signed by us this 14th day of December, 1891.

AMBROSE A. TRIPOLD.
CHARLES F. DAVENPORT.

Witnesses:
JOHN McAFFER,
NOAH CLARK.